(12) United States Patent
Shaw

(10) Patent No.: US 8,565,143 B2
(45) Date of Patent: Oct. 22, 2013

(54) DYNAMIC CONTENT DISTRIBUTION IN MOBILE TELECOMMUNICATIONS NETWORK

(75) Inventor: Venson Shaw, Kirkland, WA (US)

(73) Assignee: AT&T Mobility II, LLC, Atlanta, GA (US)

( * ) Notice: Subject to any disclaimer, the term of this patent is extended or adjusted under 35 U.S.C. 154(b) by 774 days.

(21) Appl. No.: 12/580,860

(22) Filed: Oct. 16, 2009

(65) Prior Publication Data

US 2011/0090838 A1  Apr. 21, 2011

(51) Int. Cl.
*H04W 4/00* (2009.01)

(52) U.S. Cl.
USPC .......................................................... 370/313

(58) Field of Classification Search
USPC .......................................................... 370/329
See application file for complete search history.

(56) References Cited

U.S. PATENT DOCUMENTS

| | | | |
|---|---|---|---|
| 7,089,015 B2 | 8/2006 | Fukui | |
| 7,317,702 B2 | 1/2008 | Dominique et al. | |
| 2003/0119452 A1* | 6/2003 | Kim et al. ........................ | 455/69 |
| 2004/0110473 A1 | 6/2004 | Rudolf et al. | |
| 2006/0087980 A1 | 4/2006 | Ikeda et al. | |
| 2006/0160556 A1 | 7/2006 | Mueller et al. | |
| 2008/0026744 A1 | 1/2008 | Frederiksen et al. | |
| 2008/0043867 A1 | 2/2008 | Blanz et al. | |
| 2008/0081635 A1* | 4/2008 | Jonsson ...................... | 455/452.2 |
| 2008/0095185 A1 | 4/2008 | DiGirolamo et al. | |
| 2008/0144553 A1* | 6/2008 | Shao et al. ..................... | 370/310 |
| 2008/0274692 A1* | 11/2008 | Larsson .......................... | 455/24 |
| 2009/0190528 A1 | 7/2009 | Chung et al. | |

OTHER PUBLICATIONS

Said M. Abd el-atty et al., "Reducing CQI Signalling Overhead in HSPA," Hindawi Publishing Corporation Research Letter, vol. 2008, ID 982805, 5 pgs.

* cited by examiner

*Primary Examiner* — Sulaiman Nooristany
(74) *Attorney, Agent, or Firm* — Akerman Senterfitt; Michael K. Dixon; Roy Zachariah

(57) ABSTRACT

A mobile telecommunications network is configured to dynamically adapt transmitted content according to the channel quality of the network link connecting a destination mobile device to the mobile telecommunications network. Channel quality indicators (CQIs) for the mobile devices associated with the mobile telecommunications network are cached at one or more support nodes of a core network. Components of the core network therefore can request the CQI of a mobile device from a corresponding support node rather than repeating a process of determining anew the condition of the network linking to a mobile device each time content is to be communicated to or from a mobile device. A service provider receiving the CQI for a mobile device from the cache of a support node can adapt the content to be provided to the mobile device to the particular conditions of the network represented by the CQI.

17 Claims, 4 Drawing Sheets

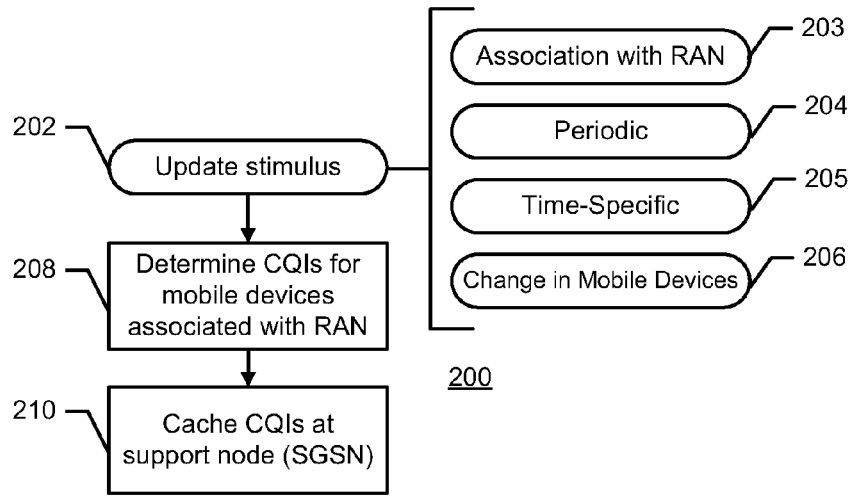
FIG. 2
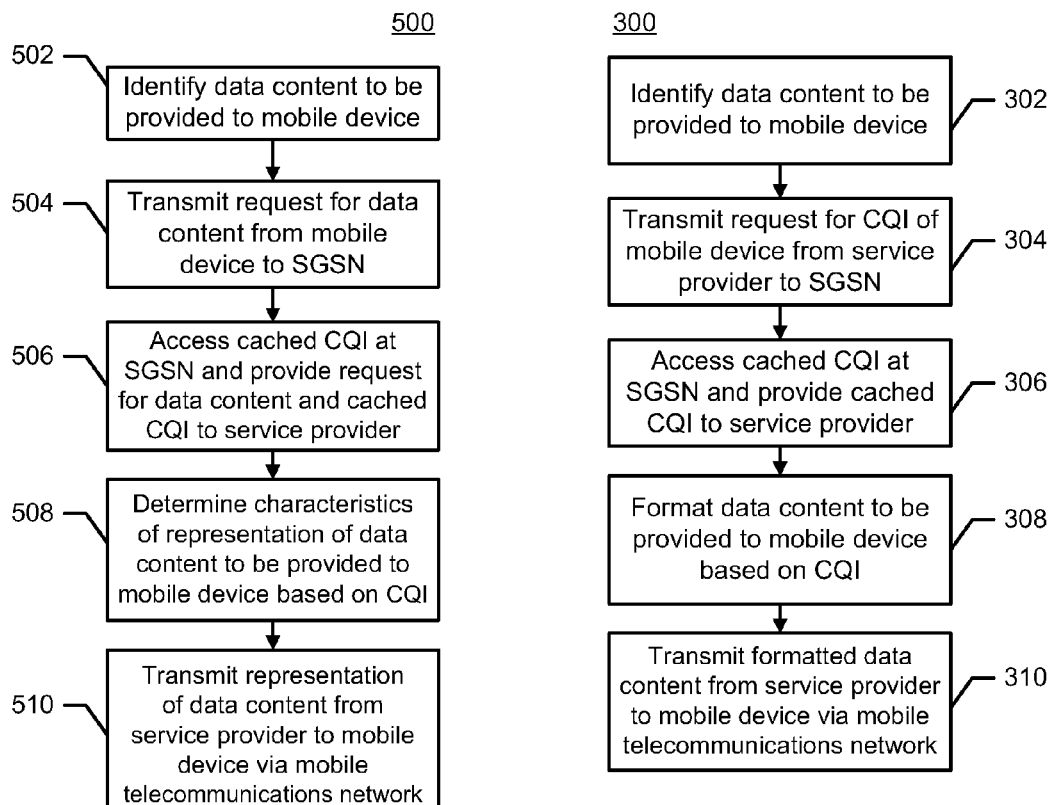
FIG. 5
FIG. 3

DYNAMIC CONTENT DISTRIBUTION IN MOBILE TELECOMMUNICATIONS NETWORK

FIELD OF THE DISCLOSURE

The present disclosure relates generally to mobile telecommunications networks, and relates more particularly to distribution of content via a mobile telecommunications network.

BACKGROUND

Mobile telecommunications networks increasingly are implementing the distribution of bandwidth-intensive content to and from wireless mobile devices (such as mobile terminating devices and mobile originating devices). As radio access network conditions frequently change and are a limiting factor in the transmission of content, content sources and other providers of content often are required to adapt the content to the current network conditions in order to more fully ensure successful content delivery.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 2 is a flow diagram illustrating a method for determining and caching CQIs in accordance with at least one embodiment of the present disclosure;

FIG. 3 is a flow diagram illustrating a method for a service provider-initiated distribution of content in the mobile telecommunications network of FIG. 1 in accordance with at least one embodiment of the present disclosure;

FIG. 5 is a flow diagram illustrating a method for a mobile device-initiated distribution of content in the mobile telecommunications network of FIG. 1 in accordance with at least one embodiment of the present disclosure;

The use of the same reference symbols in different drawings indicates similar or identical items.

DETAILED DESCRIPTION OF THE DRAWINGS

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

For ease of discussion, the techniques of the present disclosure are illustrated in the example context of a third generation (3G) or fourth generation (4G) mobile telecommunications network utilized to convey voice data, multimedia data, and other content between mobile devices, service providers, and other components of the network. However, these techniques are not limited to this example context, but instead can be implemented in any of a variety networks configured to support the transmission of content to mobile devices using the guidelines provided herein without departing from the scope of the present disclosure.

FIGS. 1-7 illustrate techniques for distributing content in a mobile telecommunications network whereby the content is dynamically adapted to the channel quality of the network link connecting the destination mobile device to the mobile telecommunications network. In at least one embodiment, channel quality indicators (CQIs) for the mobile devices associated with the mobile telecommunications network are cached at one or more support nodes of a core network. Components of the core network therefore can request the CQI of a mobile device from a corresponding support node rather than repeating a signal analysis process for the network linking to a mobile device each time content is to be communicated to or from a mobile device. A service provider receiving the CQI for a mobile device from the cached CQI information of a support node then can adapt the content to be provided to the mobile device to the particular conditions of the network represented by the CQI. For example, a service provider could communicate streaming video to the mobile device in a low, medium, or high resolution format depending on the network condition represented by the CQI information for the mobile device that is cached at the support node.

Figure 1:
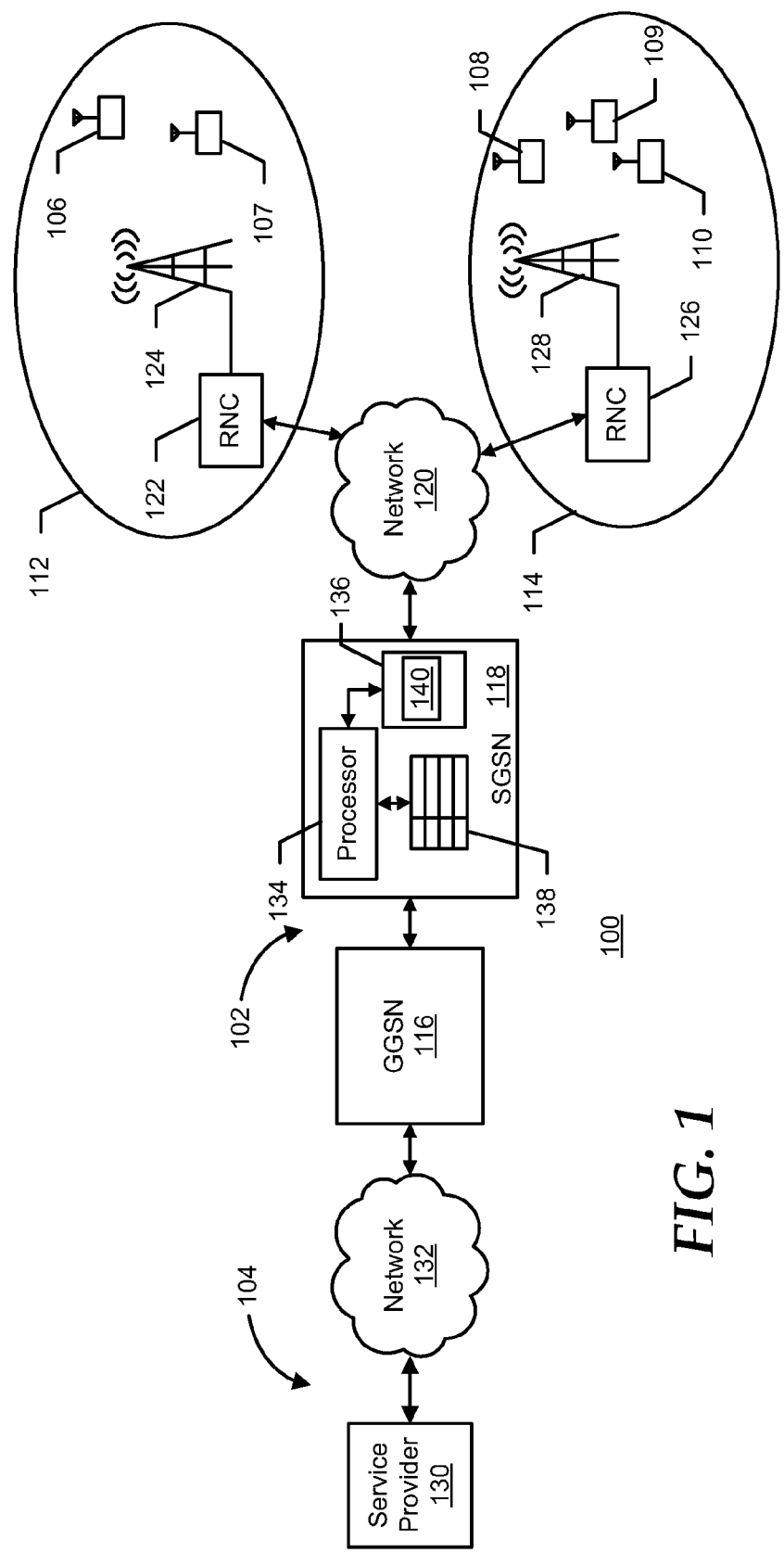
FIG. 1 is a diagram illustrating a mobile telecommunications network employing cached channel quality indicators (CQIs) at a support node of a core network in accordance with at least one embodiment of the present disclosure.

FIG. 1 illustrates a mobile telecommunications network 100 implementing cached CQI information in accordance with at least one embodiment of the present disclosure. The mobile telecommunications network 100 can include a network compliant with one or more mobile telephony standards, such as the Global System for Mobile Communication (GSM) standard, the Universal Mobile Telecommunications System (UMTS) standard, and the like. The mobile telecommunications network 100 includes a core network 102, a provider network 104, and one or more mobile devices, such as mobile devices 106-110. The mobile devices 106-110 can include any of a variety of mobile telephony-enabled portable devices, such as mobile phones, personal digital assistants, mobile-telephony enabled personal computers, and the like.

The core network 102 includes at least one radio access network (RAN) (also frequently referred to as a base station subsystem or BSS), such as RAN 112 and RAN 114; one or more support nodes, such as a Gateway General Packet Radio System Support Node (GGSN) 116 and a Serving General Packet Radio System Support Node (SGSN) 118; and a network segment 120 connecting a support node at the mobile-facing edge of the core network 102 (such as the SGSN 118) to the RANs 112 and 114. The network segment 120 typically includes a data link layer-based network, such as an Asynchronous Transfer Mode (ATM) network. Although not illustrated in FIG. 1, the core network 102 further can include other components commonly implemented in core networks, such as one or more Mobile Switching Centers (MSCs) for connecting to other telephony networks.

Each RAN includes a radio network controller (RNC) (also frequently referred to as a base transceiver station or BTS) and one or more radio transceivers. To illustrate, the RAN 112 includes a RNC 122 and a radio transceiver 124 and the RAN 114 includes a RNC 126 and a radio transceiver 128. The RNCs 122 and 126 initiate and conduct wireless communications between the core network 102 and the respective mobile devices associated with each RAN.

The provider network 104 includes one or more service providers 130 connected to a support node of the core network 102 at the infrastructure-facing edge (such as the GGSN 116) via a corresponding network segment 132. The network segment 132 can include, for example, an Internet Protocol (IP) network or an X.25 network. The service providers 130 can include any of a variety of providers or sources of services or content including, but not limited to, media servers; telephony providers; and data communications providers such as Short Message Service (SMS) providers, Multimedia Message Service (MMS) providers, e-mail service providers, and the like. Further, although the example of FIG. 1 depicts the service provider 130 as implemented in an external network outside of the core network 102 (such as a service provider 130 connected to the core network 102 via the Internet), in alternate embodiments one or more service providers 130 may be implemented within the core network 102.

The SGSN 118 is responsible for the delivery of data packets to and from the mobile devices within an associated geographical area (such as the coverage areas provided by the RANs 112 and 114) via the network link 120. The processing provided by the SGSN 118 can include packet routing and transfer, mobility management (association/disassociation and location management), logical link management, and authentication. The GGSN 116 operates to conduct communications between the one or more SGSNs 118 of the core network 102 and one or more external packet switched networks, such as the network segment 132 connecting the service provider 130 to the core network 102. Global Packet Radio System (GPRS) packets received from the SGSN 118 are converted by the GGSN 116 into an appropriate packet data protocol (PDP) format and then provided to the network segment 132 for transmission to the next destination, such as the service provider 130. Conversely, incoming data packets from the network segment 132 are converted by the GGSN 116 into corresponding GPRS packets and the GGSN then provides the GPRS packets to the SGSN 118 for transmission to the appropriate mobile devices via the RANs 112 and 114. As such, the SGSN 118 acts as the edge router for the core network 102 that faces the mobile devices 106-110 and the GGSN 116 acts as the edge router for the core network 102 that faces the external/infrastructure networks.

The mobile telephony network 100 operates to provide services and to communicate voice data, multimedia data, and other content between mobile devices, service providers, and other networks such as the public switched telephone network (PSTN). Often, such communications are adapted to the bandwidth or other characteristics of the network link between the source of the content and the destination of the content. For example, the wireless link between the radio transceiver 124 and the wireless device 106 typically would be the bottleneck in the link between the service provider 130 and the mobile device 106. Accordingly, to provide a particular content to the mobile device 106, the service provider 130 uses the channel quality indicator (CQI) associated with the wireless device 106, which represents the condition of the wireless link with the mobile device 106, to adapt the content to the particular bandwidth/throughput limitations indicated by the CQI before transmitting the resulting formatted content to the mobile device 106 via the wireless telephony network 100. The formatting applied for this adaptation can include, for example, increasing or decreasing the quality of the content (such as using a higher or lower quality resolution for content comprising video content), increasing or decreasing the degree of compression applied to the content before transmission, and the like.

Conventionally, the CQI of a mobile device is determined anew each time content is to be communicated to or from the mobile device. This process typically includes a signal analysis process whereby a RNC of a RAN measures the signal-to-noise ratio (SNR) and other characteristics of a signal transmitted between the wireless device and the corresponding radio transceiver and the RNC then determines the current CQI based on these measured characteristics. The CQI also may be based on other factors, such as the Doppler shift, channel estimation error, or the type of transmitter or receiver used in communicating with the mobile device. As such, the frequent recalculation of the CQI in conventional networks consumes considerable bandwidth between the radio transceiver and the corresponding mobile devices. In order to provide more efficient communications and resource utilization, the core network 102 is configured to cache CQI information for the mobile devices 106-110 at one or more support nodes of the core network 102 such that the CQI for a mobile device can be obtained from a support node rather than having to recalculate the CQI based on the signal analysis process described above. Further, because network conditions typically are rarely static, the cached CQI information is periodically updated or otherwise updated in response to identified stimuli.

In one embodiment, the CQI information is cached at the support node at the edge of the core network 102 that faces the mobile devices 106-110. To illustrate, the SGSN 118 is the first support node of the core network 102 encountered by transmissions from the mobile devices 106-110 and thus the SGSN 118 can be configured to cache the CQI information for the mobile devices 106-110. As described below, this CQI information typically is updated with some frequency, so locating the cache of CQI information at the SSGN 118 reduces or eliminates communications within the core network pertaining to the updates to the CQI information. In an alternate embodiment, the CQI information can be cached at another support node. To illustrate, because the GGSN 116 is the first support node of the core network 102 facing the service providers 130, the CQI information can be cached at the GGSN 116 so as to minimize communications within the core network 102 pertaining to the provision of the CQI information to the service providers 130. Further, the CQI information can be cached at multiple support nodes, such as caching the CQI information at both the GGSN 116 and the SGSN 118.

With the CQI information cached at one or more support nodes of the core network 102, a service provider can access the CQI for a mobile device from a support node and format content for the mobile device based on the CQI without requiring the recalculation of the CQI for each transmission of content. To illustrate, the service provider 130 may identify the mobile device 107 as an intended recipient of multimedia content. Accordingly, the service provider 130 can obtain the CQI of the mobile device 107 from the SGSN 118 and format the particular resolution of the multimedia content to be transmitted to the mobile device 107 based on the CQI without first involving the mobile device 107, the radio transceiver 124, and the RNC 122 in a signal analysis process to determine the CQI of the mobile device 107 in anticipation of the transmission of the multimedia content. Similarly, the mobile device 110 may intend to obtain multimedia content from the service provider 130. However, rather than requiring the mobile device 110 to initiate the CQI calculation process anew for this desired multimedia content, the mobile device 110 instead may send a request for the multimedia content to the service provider 130 via the core network 102 without an indication of the CQI of the mobile device 110. The SGSN 118 then may access the cached CQI for the mobile device 110 and append the cached CQI to the request before forwarding the request on to the service provider 130 via the GGSN 116. The service provider 130 then may use the CQI appended to the request to communicate the multimedia content identified by the request to the mobile device 110 in a format appropriate for the network condition for the mobile device 110.

In one embodiment, the CQI caching function is a software-based implementation at the support node. Accordingly, the support node can include a processor 134, a memory 136, and a data store 138. The data store 138 can include, for example, a cache, a memory, a register file, a hard drive, and the like. In this implementation, the memory 136 stores a computer program 140 that comprises instructions accessed and executed by the processor 134 to implement the caching functions described herein. In an alternate embodiment, the CQI caching function can be hardware implemented using an application specific integrated circuit (ASIC) or other logic/circuitry to implement the CQI caching function without software control.

The data store 138 stores the CQI information in an appropriate data structure, such as a table or database structure. To illustrate, the CQI information can be arranged in a table having a plurality of entries, each entry associated with a corresponding mobile device and having one field to store a unique identifier associated with the mobile device and another value to store the current CQI value for the mobile device. The support node then can use the unique identifier of the mobile device to access the corresponding field storing the CQI value for the mobile device. The unique identifier can include, for example, the mobile device's telephone number, the International Mobile Station Equipment Identity (IMEI) value, and the like. The CQI value can be implemented in any of a variety of ways. CQIs commonly are implemented as one or more values, which are then used to index an entry of a corresponding table to identify the particular network characteristics associated with the CQI value or values.

FIG. 2 illustrates an example method 200 for caching the CQI information for mobile devices in the mobile telecommunications network 100 of FIG. 1 in accordance with at least one embodiment of the present disclosure. The method 200 initiates at block 202, whereby an update stimulus occurs at a RAN of the mobile telecommunications network 100, or alternately at the support node that serves to cache the CQI information. The update stimulus can comprise any of a variety of stimuli independent of a request for content distribution. To illustrate, the update stimulus can occur when a mobile device associates with the RAN (block 203); upon expiration of a predetermined period timed using a timer or other timing mechanism (block 204); when a particular time of day occurs (block 205); or in response to some characteristic (or a change thereof) of the mobile devices associated with the RAN exceeds a predetermined threshold (block 206), such as when the number of mobile devices associated with the RAN grows to fall above one threshold or shrinks to fall below another threshold.

In response to the update stimulus, at block 208 the RNC of the RAN conducts the signal analysis process described above to determine the network characteristics, and the CQI corresponding to the network characteristics, for each mobile device subject to the update process. At block 210, the RNC forwards the CQI values determined for the subject mobile devices to the support node within the core network 102. The support node then updates the data store 138 to reflect the updated CQI values, such as by overwriting the previous CQI values stored in the data store 138 for the associated mobile devices.

Figure 4:
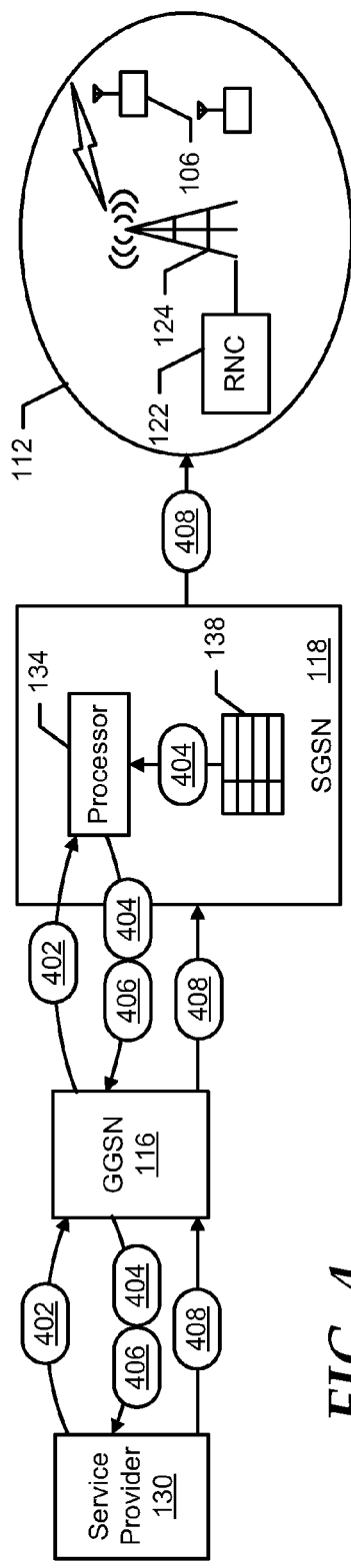
FIG. 4 is a diagram illustrating an example of the method of FIG. 3 in the mobile telecommunications network of FIG. 1 in accordance with at least one embodiment of the present disclosure.

FIGS. 3 and 4 illustrate an example method 300 for utilizing the cached CQI information to facilitate a service provider-initiated distribution of content to a mobile device in accordance with at least one embodiment of the present disclosure. For ease of illustration, this method is described in a context whereby the SGSN 118 serves as the CQI caching support node for the core network 102. At block 302, a service provider 130 identifies a mobile device (such as mobile device 106) and content to be provided to the identified mobile device. To illustrate, the service provider 130 may serve to distribute advertising content to mobile devices within the mobile telephony network 100 and the mobile device 106 may be identified to the service provider 130 as an intended recipient of a particular advertising content in response to, for example, a user using the mobile device 106 to browse a webpage related to the subject of the particular advertising content.

At block 304 the service provider 130 forwards a request 402 for the CQI of the mobile device 106 to the core network 102 via the GGSN 116, which then routes the request 402 to the SGSN 118 as the support node providing the CQI caching for the core network 102. The request 402 includes an identifier associated with the mobile device 106, such as the particular telephone number or IMEI of the mobile device 106. In response to receiving the request 402, at block 306 the processor 134 of the SGSN 118 accesses the data store 138 and uses the unique identifier provided in the request 402 to obtain the CQI 404 for the mobile device 106. This process is performed without requiring that that the CQI be determined anew with the involvement of the RAN 112 or the mobile device 106. The SGSN 118 then appends or otherwise associates the accessed CQI 404 to a response 406 and provides the response 406 to the service provider 130 via the GGSN 116.

At block 308 the service provider accesses the CQI 404 from the response 406 and uses the CQI 404 to evaluate the characteristics of the wireless link to the mobile device 106. In one embodiment, the CQI 404 comprises a value which is used by the service provider 130 to index a particular entry of a CQI table, whereby the indexed entry contains network parameter information corresponding to the associated CQI value, such as bandwidth information, SNR information, quality-of-service (QoS) capability information, and the like. Based on these parameters, the service provider 130 formats the content intended for the mobile device 106 such that the resulting representation of the content is sufficiently likely to be successfully transmitted to the mobile device 106 in view of the current conditions of the wireless link with the mobile device 106. This formatting can include, for example, changing the quality of the content (such as changing the resolution or bit rate of multimedia content), changing the compression ratio applied to the content prior to transmission, and the like. With the content so formatted, at block 310 the service provider provides the resulting formatted content 408 to the core network 102 for transmission to the wireless device 106. In the illustrated example, the formatted content 408 is transmitted as a stream of IP packets via the network segment 132 (FIG. 1) to the GGSN 116, which then converts the IP packets into corresponding GPRS packets and tunnels the GPRS packets to the SGSN 118. The SGSN 118 then routes the GPRS packets to the RNC 122 of the RAN 112 for wireless transmission to the wireless device 106.

Figure 6:
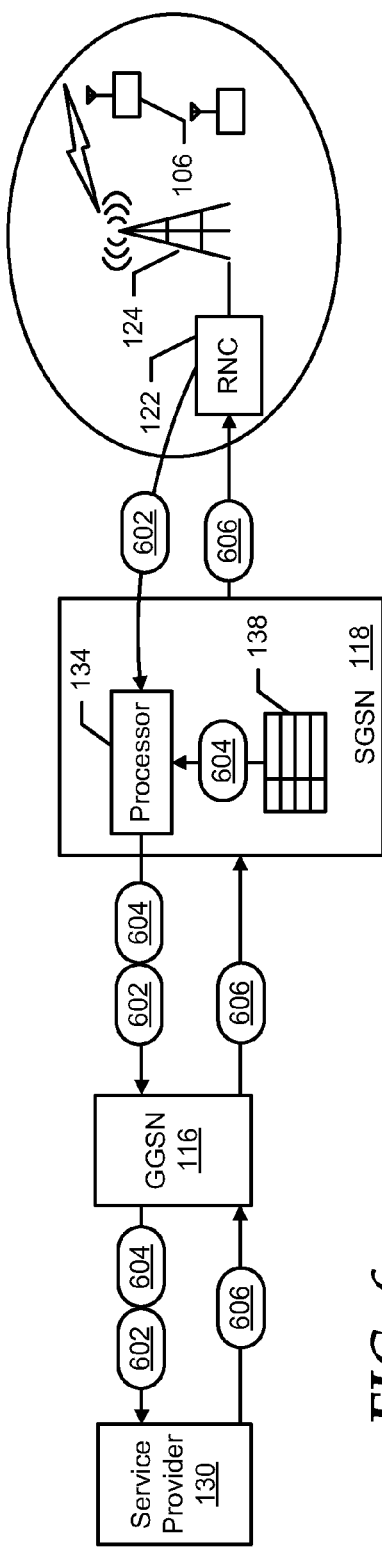
FIG. 6 is a diagram illustrating an example of the method of FIG. 5 in the mobile telecommunications network of FIG. 1 in accordance with at least one embodiment of the present disclosure.

FIGS. 5 and 6 illustrate an example method 500 for utilizing the cached CQI information to facilitate a mobile device-initiated distribution of content to a mobile device in accordance with at least one embodiment of the present disclosure. For ease of illustration, this method is described in a context whereby the SGSN 118 serves as the CQI caching support node for the core network 102. At block 502, a mobile device (such as mobile device 106) identifies content to be provided to the mobile device. To illustrate, a user may interact with an interface of the mobile device 106 so as to initiate a request for web-based content. At block 504, the mobile device 106 transmits a request 602 for the identified data to the SGSN 118 via the radio transceiver 124 and the RNC 122. The request 602 includes an identifier associated with the requested content and a unique identifier associated with the mobile device 106, such as the telephone number or the IEMI of the mobile device. At block 506, the SGSN 118 accesses the cached CQI information in the data store 138 using the unique identifier in the request 502 to obtain the CQI 604 for the mobile device 106. Using the identifier associated with the requested content to identify the service provider 130 that is the source of the requested content, the SGSN 118 then appends or otherwise associates the CQI 604 with the request 602 and transmits the request 602 and the CQI 604 to the identified service provider 130 via the GGSN 116.

At block 508 the service provider accesses the CQI 604 from the request 602 and uses the CQI to evaluate the characteristics of the wireless link to the mobile device 106. Based on these parameters, the service provider 130 formats the content requested by the mobile device 106 such that the resulting formatted content is sufficiently likely to be successfully transmitted to the mobile device 106 in view of the current conditions of the wireless link with the mobile device 106. At block 510 the service provider provides the resulting formatted content 606 to the core network 102 for transmission to the wireless device 106 in the manner described above with respect to block 310 of FIG. 3.

As methods 300 and 500 illustrate, the caching of CQI information at a support node of the core network 102 can reduce traffic within the mobile telecommunications network 100. Rather than performing the signal analysis to determine the CQI for a mobile device each time content is to be provided to a mobile device, the cached CQI information at a support node of the core network instead can be accessed to determine the CQI for the mobile device. As such, the transmission of content to and from mobile devices can be more efficiently adapted to current network conditions.

Figure 7:
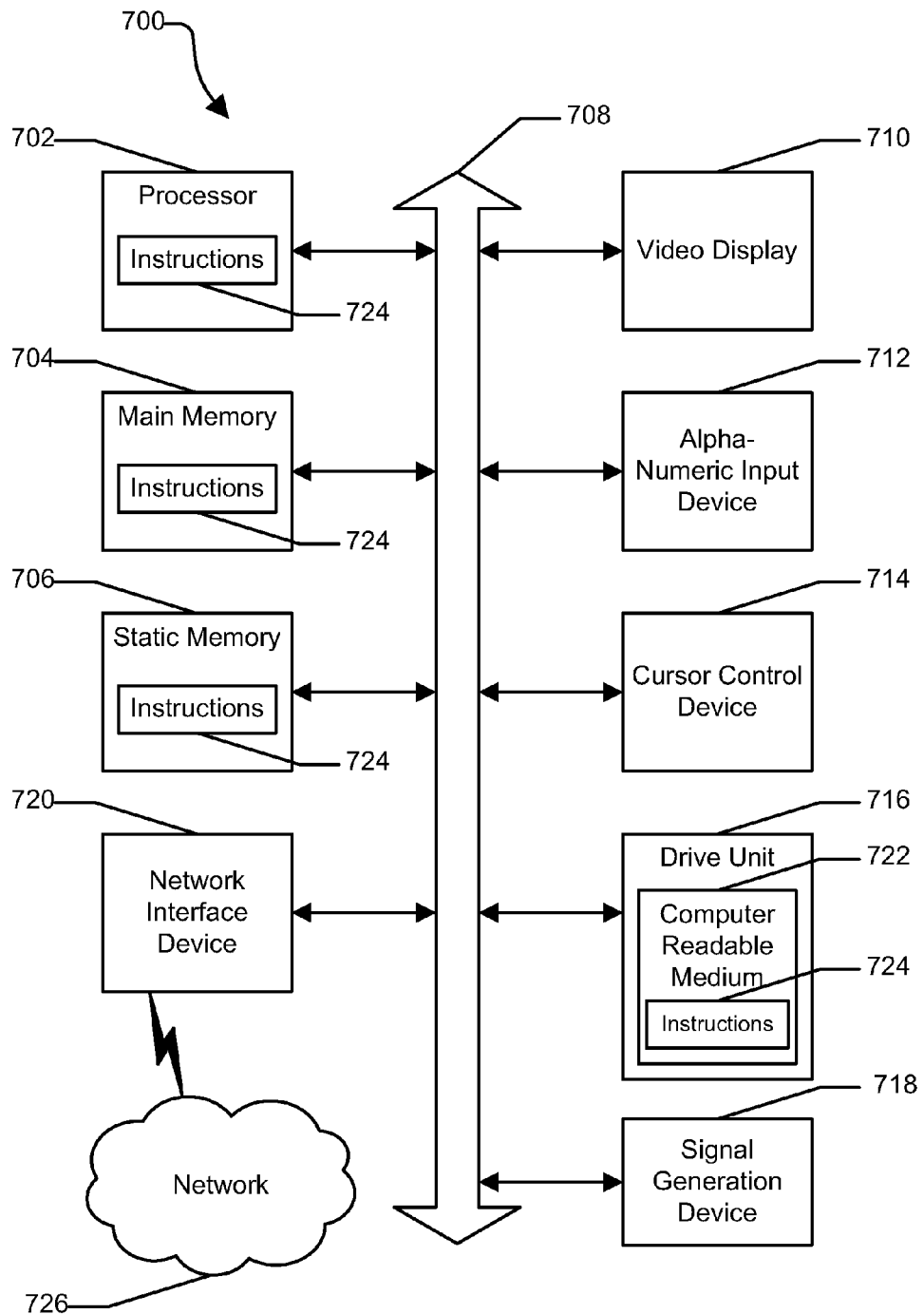
FIG. 7 is a diagram illustrating an example computer system for implementing one or more of the components or techniques described herein in accordance with at least one embodiment of the present disclosure.

FIG. 7 shows an illustrative embodiment of a general computer system 700 in accordance with at least one embodiment of the present disclosure. The computer system 700 can include a set of instructions that can be executed to cause the computer system 700 to perform any one or more of the methods or computer based functions disclosed herein. The computer system 700 may operate as a standalone device or may be connected via a network to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into, for example, a STB device. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal, so that a device connected to a network can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writeable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission such as TCP/IP, UDP/IP, HTML, and HTTP represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. In a mobile telecommunications network, a method comprising:
   caching, by utilizing instructions from memory that are executed by a processor, a plurality of channel quality indicators for a corresponding plurality of mobile devices determining a select channel quality indicator in response to a stimulus of a change in a number of mobile devices associated with a radio access network;
   accessing a select channel quality indicator associated with a select mobile device in response to receiving a request associated with the select mobile device; and providing the select channel quality indicator to a service provider for use in providing content to the select mobility device;
   wherein further determining the select channel quality indicator associated with the select mobile device independent of the request associated with the select mobile device;
   providing the select channel quality indicator to a support node;
   formatting the content based on the select channel quality indicator to generate a formatted content; and
   transmitting the formatted content to the select mobile device.

2. The method of claim 1, wherein the request associated with the select mobile device comprises a request for the select channel quality indicator received from the service provider.

3. The method of claim 1, wherein the request associated with the select mobile device comprises a request for the content received from the mobile device.

4. The method of claim 3, further comprising:
   providing the request for content from a support node to the service provider; and
   wherein providing the select channel quality indicator to the service provider comprises providing the select channel quality indicator to the service provider in association with the request for content.

5. The method of claim 1, wherein the stimulus further comprises conditions selected from the group consisting of an association of the mobile device with the radio access network corresponding to the radio network controller a lapse of a predetermined duration, an occurrence of a predetermined time of day and a combination thereof.

6. The method of claim 1, wherein the content comprises multimedia content, and wherein formatting the content comprises formatting a video resolution of the multimedia content based on the select channel quality indicator.

7. A mobile telecommunications network comprising:
   a core network comprising a support node coupled to a content source and to a radio access network, the support node comprising:
   a memory that stores instructions;
   a processor that executes the instructions to perform operations comprising:
   caching a plurality of channel quality indicators associated with a plurality of mobile devices of the mobile telecommunications network;

determining a select channel quality indicator in response to a stimulus of a change in a number of mobile devices associated with the radio access network;

accessing a select channel quality indicator associated with a select mobile device in response to receiving a request associated with the select mobile device;

providing the select channel quality indicator to a service provider for use in providing content to the select mobile device;

wherein the operations further comprise:

formatting the content based on the select channel quality indicator to generate a formatted content; and providing the formatted content for transmission to the select mobile device.

8. The mobile telecommunications network of claim 7, wherein the request associated with the select mobile device comprises a request for the select channel quality indicator received from the service provider.

9. The mobile telecommunications network of claim 7, wherein the request associated with the select mobile device comprises a request for the content received from the mobile device.

10. The mobile telecommunications network of claim 9, wherein the operations further comprise:

forwarding the request for the content to the service provider; and providing the select channel quality indicator to the service provider in association with the request for the content.

11. The mobile telecommunications network of claim 7, wherein the operations further comprise:

determining the select channel quality indicator associated with the select mobile device independent of the request associated with the select mobile device;

providing the select channel quality indicator to the support node for caching.

12. The mobile telecommunications network of claim 11, wherein the stimulus further comprises conditions selected from the group consisting of an association of the mobile device with the radio access network, a lapse of a predetermined duration, an occurrence of a predetermined time of day and a combination thereof.

13. The mobile telecommunications network of claim 7, wherein the content comprises multimedia content, and wherein the operations further comprise service provider is to format formatting the content by formatting a video resolution of the multimedia content based on the select channel quality indicator.

14. The mobile telecommunications network of claim 7, wherein the support node comprises a serving general packet radio service support node.

15. In a mobile telecommunications network, a method comprising:

determining a content to be transmitted to a select mobile device of the mobile telecommunications network;

transmitting, to a support node of the mobile telecommunications network, by utilizing instructions from memory that are executed by a processor, a request for a channel quality indicator associated with the select mobile device;

determining, a select channel quality indicator in response to a stimulus of a change in a number of mobile devices associated with a radio access network, the select channel quality indicator associated with the select mobile device from a plurality of channel quality indicators cached for a plurality of mobile devices;

transmitting, to the service provider, a representation of the select channel quality indicator;

formatting the content based on the select channel quality indicator to generate a formatted content; and transmitting the formatted content to the select mobile device.

16. The method of claim 15, wherein the content comprises multimedia content, and wherein formatting the content comprises formatting a video resolution of the multimedia content based on the select channel quality indicator.

17. The method of claim 15, further comprising determining the content to be transmitted to the select mobile device independent of a request for the content from the mobile device.

* * * * *